United States Patent [19]

Niwa et al.

[11] Patent Number: 4,659,203
[45] Date of Patent: Apr. 21, 1987

[54] BAYONET MOUNT ARRANGEMENT

[75] Inventors: Masatake Niwa; Yukio Maekawa, both of Osaka, Japan

[73] Assignee: Minolta Camera Kabushiki Kaisha, Tokyo, Japan

[21] Appl. No.: 645,144

[22] Filed: Aug. 28, 1984

[30] Foreign Application Priority Data

Sep. 2, 1983 [JP] Japan ................................ 58-162361

[51] Int. Cl.$^4$ .......................... G03B 17/14; G02B 7/02
[52] U.S. Cl. ...................................... 354/286; 350/257
[58] Field of Search ................. 354/286; 350/252, 257

[56] References Cited

U.S. PATENT DOCUMENTS

| 2,260,991 | 10/1941 | Gorey | 350/257 |
| 2,643,581 | 6/1953 | Wehrenfennig | 350/257 |
| 3,500,735 | 3/1970 | Hiroshimito | 354/286 |
| 4,017,878 | 4/1977 | Hagiwara | 350/257 |
| 4,239,364 | 12/1980 | Doi | 354/286 |
| 4,302,077 | 11/1981 | Sato et al. | 350/257 |
| 4,307,954 | 12/1981 | Ludwig | 354/286 |

OTHER PUBLICATIONS

Camera Technology Handbook, published Jul. 15, 1979, pp. 58, 59 (with translation).

Primary Examiner—A. A. Mathews
Attorney, Agent, or Firm—Wolder, Gross & Yavner

[57] ABSTRACT

An interchangeable lens unit is detachably attachable to a camera main body through an improved bayonet arrangement which includes three sets of corresponding bayonet claws, one of the corresponding bayonet claws of each set being provided on a mount member of the lens unit and the other on a mount member of the camera main body. The bayonet claws of the three sets are formed, in mutual dimension and dispositions thereof, such that the corresponding bayonet claws of one of the sets engage one another at an upper peripheral part of the mount members immediately above the center of the mount members and the corresponding bayonet claws of the remaining two sets engage one another respectively at lateral side peripheral parts of the mount members diametrically opposite to one another with respect to the center of the mount members in the lateral direction, when the camera main body and the lens unit attached thereto are viewed from their front with the camera main body held in a normal erect state. The camera main body is provided with a spring member which can urge the bayonet claws on the mount member of the lens unit for ensuring contact between the mating mount surfaces of the mount members.

10 Claims, 14 Drawing Figures

BAYONET MOUNT ARRANGEMENT

BACKGROUND OF THE INVENTION

1. Technical field

The present invention generally relates to a coupling or connecting arrangement and more particularly, to a bayonet mount arrangement as a coupling between mating optical units in an optical instrument such as a lens interchangeable photographic camera and the like.

2. Prior art

In FIGS. 1 through 6, there are shown conventional examples of photographic cameras which employ bayonet mount arrangements of this kind.

FIG. 1 shows the relationship before meshing immediately after insertion of bayonet claws at one side into mating bayonet recesses, between a mount base 1 of a camera main body and a mount portion 2 of an interchangeable lens unit (referred to merely as a lens unit hereinafter). In the drawing, numerals 1a designates the bayonet claws of the camera main body, 1b the bayonet recesses of the camera main body, 2a the bayonet claws of the lens unit, and 2b the bayonet recesses of the lens unit. The bayonet claws 1a of the camera main body are disposed separately at three places along the inner peripheral edge of the base mount 1 of the camera main body, while, at the remaining three places along the inner peripheral edge of the mount base 1 between the respective bayonet claws 1a, the bayonet recesses 1b are provided. Similarly, in the lens unit also, the bayonet claws 2a are formed at three places along the outer peripheral edge of the mount portion 2 in positions respectively corresponding to the bayonet recesses 1b of the camera main body, with bayonet recesses 2b being disposed at the remaining three placed along the peripheral edge of the mount portion 2 in positions respectively corresponding to the bayonet claws 1a of the camera main body. In dimensions, the width of each bayonet claw 2a of the lens unit is slightly smaller than that of the corresponding bayonet recess 1b, while the width of each bayonet recess 2b of the lens unit in the circular direction is set to be slightly larger than that of the corresponding bayonet claw 1a of the camera body, whereby when the mount portion 2 of the lens unit is inserted into the mount base 1 of the camera main body in a regular corresponding relation as shown in FIG. 1, the bayonet claws 1a and 2a of the both sides do not interfere with each other, whereas when the mount portion 2 of the lens unit is intended to be inserted into the mount base 1 of the camera main body 1 at a different angular position, i.e. in an irregular corresponding relation, the bayonet claws 1a and 2a interfere with each other so as to prevent the insertion.

On the other hand, in a connection or coupling completed state as shown in FIG. 2 in which the mount portion 2 of the lens unit is mounted on the mount base 1 of the camera main body, there is provided a small clearance Δ between a rear face 1d of the bayonet claw 1a of the camera main body and the confronting rear face 2d of the bayonet claw 2a of the lens unit. The clearance is provided to permit the rotational mounting operation of the lens unit onto the camera main body while achieving the bayonet engagement. Moreover, between the mount base 1 of the camera main body and a front frame 3 of the camera main body on which mount base 1 is secured, a pressure spring 4 is disposed, with a spring portion thereof being disposed at a notched portion 1e formed at part of the rear face 1d of the bayonet claw 1a of the camera main body. Under the influence of pressure spring 4 as described above, in the course of rotation of the lens unit for the mounting thereof onto the camera main body, and also, in the engagement completed state, the bayonet claws 2a of the lens unit are depressed towards the camera main body side, so that any looseness or play resulting from the small clearance Δ between the corresponding bayonet claws 1a and 2a are advantageously avoided, thus making it possible to maintain corresponding seat faces 1c and 2c in a state tightly contacting each other. Furthermore, the pressure spring 4 is formed with projections (not shown) for restricting an attaching and detaching rotational angle, adapted to protrude towards the bayonet claws 2a of the lens unit.

In the known bayonet mount arrangement as described so far, when the mount portion 2 of the lens unit is rotated up to a mount lock position (not shown) in an engaging direction (i.e. clockwise in FIG. 1), from the state as shown in FIG. 1 in which the mount portion 2 of the lens unit is inserted into the mount opening of the camera main body, with a mounting pointer mark (not shown) marked in the vicinity of the mount portion 2 of the lens unit being aligned with a corresponding mounting pointer mark (not shown) located close to the mount base 1 of the camera main body, the corresponding bayonet claws 1a and 2a are engaged with each other between the mount base 1 and the mount portion 2 at the three places as shown by hatching in FIG. 2, and thus, the connection between the camera main body and the lens unit is completed. In the above connection completed state, the seat faces 1c and 2c are held in close contact with each other not only at the portions where the bayonet claws 1a and 2a of the camera main body and the lens unit are in mesh with each other as shown in FIG. 3, but also, at the portions where the bayonet claws 1a and 2a are not present as shown in FIG. 4.

However, in the prior art bayonet mount arrangement as described in the foregoing, of the engaging portions between the bayonet claws 1a and 2a in the above mounting completed state, the two engaging portions, except for the engaging portion located at the upper peripheral part of the mount base 1 and the mount portion 2 right above the center 0, are positioned at the lower side peripheral parts of the mount base 1 and the mount portion 2 lower than the lateral side peripheral parts thereof diametrically opposite to one another with respect to the center 0 in the lateral direction when observed from the front side, with the camera being placed at a normally erect attitude (i.e. a posture for ordinary use), and this results in disadvantages as described hereinbelow. Meanwhile, the center 0 is the center of the mount base 1 which aligns with the optical axis of the camera and also the center of the mount portion 2 which aligns with the optical axis of the lens unit.

By way of example, when a heavy and long interchangeable lens barrel such as a telephoto lens L or the like is mounted on the camera body, the load or weight thereof is applied to the bayonet mount portion, and thus, due to the presence of the earlier described small clearance Δ provided between the rear face 1d of the bayonet claw 1a of the camera main body and the rear face 2d of the lens unit bayonet claw 2a, lens unit L is tilted downwardly as shown in FIG. 5 in an exaggerated manner. Therefore, the seat faces 1c and 2c are held in contact with each other at the lower side peripheral parts of the mount base 1 and the mount portion 2, while, at the upper peripheral part, the bayonet claws 1a and 2a are brought into direct contact with each other against the pressure spring 4, and consequently, the seat faces 1c and 2c are held in a state spaced from each other.

Accordingly, in photographing in which the bayonet mount portion is held in the normally erect attitude as shown in FIG. 2, i.e. in the shooting with the camera held horizontally, the bayonet claws 1a and 2a contact each other at the upper peripheral part of the mount base 1 and the mount portion 2.

In the above case, on the assumption that the spacing amount between the seat faces 1c and 2c at the uppermost position of the upper peripheral part is represented by δ, the distance from the lowermost position of the lower side peripheral parts where the seat faces 1c and 2c contact each other to the optical axis of the camera main body is denoted by R, and the distance from the uppermost position of the upper peripheral part where the bayonet claws 1a and 2a contact each other to the optical axis is shown by r, the angle $\theta_1$ of inclination of the lens unit with respect to the camera at such horizontally held position may be represented by $\tan^{-1} \delta/r + R$.

In contrast to the above, in shooting with the camera held vertically, wherein the cross section taken along the line IV—IV in FIG. 2 is directed vertically, the upper most position of the upper peripheral part of the mount base 1 and the mount portion 2 where the bayonet claws 1a and 2a overlap each other at this time, is located at a position spaced an angle by α from the line IV—IV. The spacing amount between the seat faces 1c and 2c at this position is also δ. This position will be represented by r·cos α when converted into a distance l in the vertical direction from the axis in case of the shooting with the camera held vertically. Accordingly, the angle $\theta_2$ of the inclination of the lens barrel with respect to the camera main body at this shooting with the camera held vertically, may be denoted by $\tan^{-1} \delta/r \cos \alpha + R$.

This means that the inclination of the lens barrel with respect to the camera main body is increased as the angle α increases, i.e. as the engaging position of the bayonet claws 1a and 2a is spaced from the position immediately above the center 0, and also that the inclination of the lens optical axis is reduced as the diameter of the bayonet mount portion becomes larger.

As is seen from the foregoing description, in the conventional bayonet mount arrangement as explained so far, the inclination of the lens system of the lens unit with respect to the film surface inside the camera main body is increased in photographing with the camera held vertically, thus resulting in the so-called "one sided out-of-focus" so as to deteriorate the photographing performance (i.e., image definition). Therefore, as a countermeasure against such an inconvenience, it becomes necessary to increase the degree of close contact between the seat faces 1c and 2c by increasing the force urging rear face 2d of the bayonet claw 2a of the lens unit towards the camera main body side, with the urging force of the present spring 4 being increased. On the other hand, however, if the degree of close contact between the seat faces 1c and 2c is increased, the respective seat faces 1c and 2c tend to be easily injured by the sliding movements thereof during the rotation in the attaching or detaching of the lens unit onto or from the camera main body. There are also invited such problems that when the pressure on the rear face 2d of the bayonet claw 2a of the lens unit is increased, the contact face of the pressure spring 4 scrapes the rear face 2d of the bayonet claw 2a, giving rise to the formation of abraded particles, and furthermore that the torque required during the mounting or demounting is undesirably increased, with a deterioration in the operability during exchanging of interchangeable lens units.

SUMMARY OF THE INVENTION

Therefore, it is a primary object of the present invention to provide a bayonet mount arrangement of an optical instrument, which is capable of reducing the inclination of one optical unit of the optical instrument due to the load or weight thereof, with the one optical unit coupled with a mating optical unit and with the optical instrument held in a vertical position, thereby to eliminate various problems in the conventional arrangement as described so far.

According to the present invention, one optical unit which is interchangeable includes an annular mount member, and three radially outwardly projecting mutually angularly separated bayonet claws provided integrally with the mount member. On the other hand, the other optical unit which is a main optical unit includes an annular mount member, three radially inwardly projecting mutually angularly spaced bayonet claws provided integrally with the mount member of the other optical unit, and a biasing means. The bayonet claws on the side of the one optical unit and those on the side of the other optical unit respectively correspond to each other such that there are three sets of the corresponding bayonet claws. The bayonet claws of the three sets are so dimensioned and relatively disposed, such that the corresponding bayonet claws of one of the sets engage or overlaps one another at an upper peripheral part of the mount members immediately above the center of the mount members and the corresponding bayonet claws of the remaining two sets engage or overlap one another respectively, at the lateral side peripheral parts of the mount members diametrically opposite to one another with respect to the center of the mount members in the lateral direction, wherein the engaging positions of the corresponding bayonet claws of the three sets referred to above are defined by viewing the other optical unit and the one optical unit regularly attached thereto from their front with the other optical unit held in a normal erected state, i.e., in a horizontal or lateral photographing or shooting position. The biasing means is provided with three spring portions, each located at the rear side of each of the bayonet claws on the mount member of the other optical unit. The spring portions urge the front faces of the bayonet claws on the mount member of the one optical unit for ensuring contact between the mating mount surfaces of the two mount members when the one optical unit is regularly attached to the other optical unit. A small clearance is provided between the corresponding bayonet claws of each of the sets with the mating mount surfaces of the two mount members in contact with one another.

These and other aspects and features of the present invention will become apparent from the description of the preferred embodiments given hereinbelow.

DESCRIPTION OF THE PREFERRED EMBODIMENT

Referring particularly to FIGS. 7 through 12, an improved bayonet mount arrangement according to one preferred embodiment of the present invention as applied to an interchangeable lens camera will be described hereinbelow.

Figure 7:
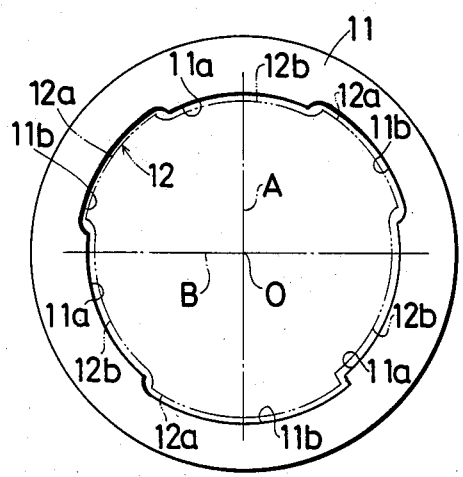
FIG. 7 is a front elevational view of one preferred embodiment of the present invention, showing the state before engagement occurs between the corresponding bayonet claws.

In FIG. 7, bayonet claws at one side are inserted into corresponding bayonet recesses at the mating side, between a mount base 11 of a camera main body and a mount portion 12 of a lens unit. In the figure, numerals 11a designates bayonet claws of the camera main body, 11b bayonet recesses of the camera main body, 12a bayonet claws of the lens unit, and 12b bayonet recesses of the lens unit. The bayonet claws 11a of the camera main body are separately provided at three places along the inner peripheral edge of the mount base 11. In the state shown in FIG. 7 in which the camera main body in a normally or correctly erect attitude is viewed from its front side, the camera main body has one claw thereof positioned at an upper peripheral part of the mount base 11 including the uppermost position (i.e. a position right above the center 0 to intersect with a vertical line indicated by a symbol A in FIG. 7) of the mount base 11. The remaining two bayonet claws 11a, 11a are located in the lateral side peripheral parts of the mount base 11 including directly lateral positions of the mount base 11 opposite to one another with respect to the center 0 (i.e. positions crossing a horizontal line indicated by a symbol B in FIG. 7). In the remaining three peripheral parts of the inner peripheral edge of the mount base 11 alternately provided with the above bayonet claws 11a, there are disposed the bayonet recesses 11b. Similarly, in the lens unit also, the bayonet claws 12a are separately provided in three places at an outer peripheral edge of a mount portion 12 so as to respectively correspond to the bayonet recesses 11b at the side of the camera main body, while at the remaining three places in the outer peripheral edge of the mount portion 12 respectively corresponding to the bayonet claws 11a of the camera main body, the bayonet recesses 12b are provided. In dimensions, the width of each of the bayonet claws 12a of the lens unit in the circular direction is slightly smaller than that of the coresponding bayonet recess 11b of the camera main body, whereas the width of each of the bayonet recesses 12b of the lens unit in the circular direction is slightly larger than that of the corresponding bayonet claw 11a of the camera main body. Accordingly, only when the mount portion 12 of the lens unit is inserted into the opening of the mount base 11 at a regular position as shown in FIG. 8, the corresponding bayonet claws 11a and 12a do not interfere with each other, whereas when it is intended to insert mount base 11 at different angular portions, the bayonet claws 11a and 12a interfere with each other so as to prevent the insertion.

Figure 8:
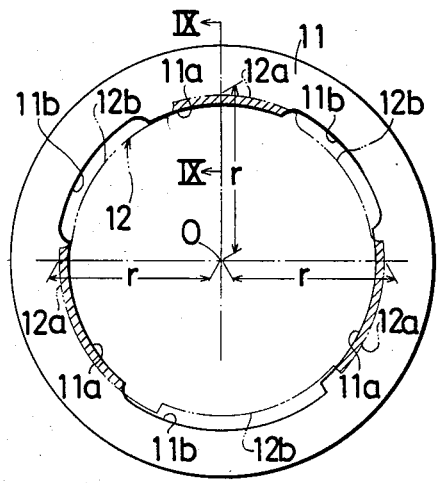
FIG. 8 is the same view as FIG. 7, showing the engagement completed state where engagement between the corresponding bayonet claws has been completed.

Meanwhile, in dimensions, the width of the bayonet claw 12a of the lens unit in the circular direction is so determined that, in the engagement or mounting completed state as shown in FIG. 8 in which mount lock means (not shown) releasably locks the lens unit relative to the camera main body, one of the three bayonet claw engaging portions as shown by hatching is located at the upper peripheral part of the mount base 11 and mount portion 12 including the uppermost position of the mount base 11 and the mount portion 12, while the remaining two bayonet claw engaging portions are positioned at the lateral side peripheral parts of the mount base 11 and the mount portion 12 including the directly lateral positions of the mount base 11 and the mount portion 12 opposite to one another with respect to the center 0.

Figure 9:
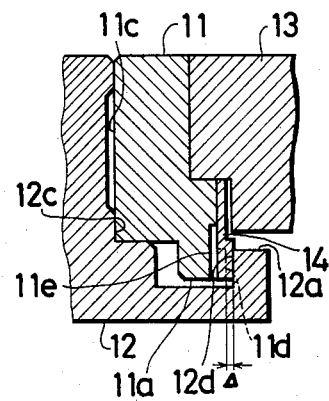
FIG. 9 is a cross section taken along the line IX—IX in FIG. 8.

In the state shown in FIG. 9 in which a seat face 12c of the mount portion 12 of the lens unit closely contacts a corresponding seat face 11c of the mount base 11 of the camera main body, there is provided a small clearance Δ between the rear face 11d of the bayonet claw 11a of the camera main body and the rear face 12d of the corresponding bayonet claw 12a of the lens unit. This clearance allows the rotational mounting operation of the lens unit onto the registry or camera main body while achieving the engagement of the claw 11a with the corresponding claw 12a.

Figure 10:
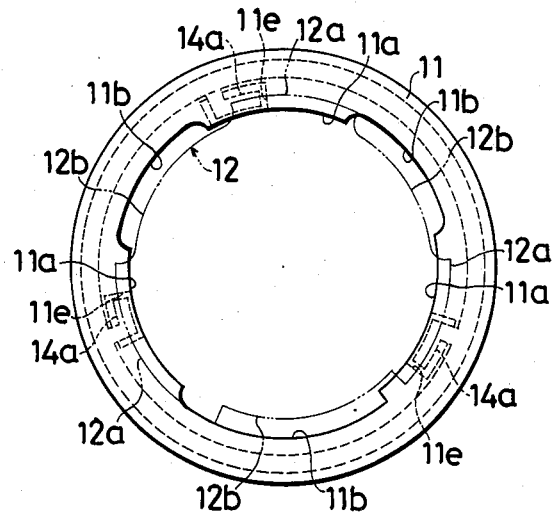
FIG. 10 is a front elevational view showing the disposition of elastic contact pieces of a pressure spring.

Moreover, in the similar manner as in the conventional arrangement described earlier, a pressure spring 14 is disposed between the mount base 11 of the camera main body and a front frame 13 to which this mount base 11 is secured. The pressure spring 14 is of a generally annular configuration having its center at 0, and has three elastic or resillient contact pieces 14a separately formed on its inner peripheral edge. These contact pieces are disposed at notched portions 11e respectively formed at part of the rear face 11d of each bayonet claw 11a of the camera main body as shown in FIG. 10, so as to be held for positioning. The respective elastic contact pieces 14a are so disposed that they are located in positions angularly away from the upper peripheral part and the opposite directly lateral side peripheral parts of the mount base 11 as the camera in the normally erect attitude is viewed from its front side, while their positions in the radial direction are approximately the same as those of the respective bayonet claws 11a. Moreover, the pressure spring 14 is formed with projections (not shown) protruding rearwards, i.e., towards the bayonet claws 12a of the lens unit in FIG. 7, for restricting the mounting and demounting rotational angle.

In the bayonet mount arrangement of this embodiment, of the engaging portions of the bayonet claws 11a and 12a in the engagement completed state as shown in FIG. 8, one engaging portion is located at the upper peripheral part of the mount base portion 11 and mount portion 12 right above the center 0 and the remaining two engaging portions are located at the lateral side peripheral parts diametrically opposite to one another with respect to the center 0 in the lateral direction. Accordingly, not only in the case of horizontal position photographing, but also in the case of vertical position shooting, the bayonet claws 11a and 12a contact each other at the uppermost position in the peripheral part of the mount base 11 and the mount portion 12.

Figure 11:
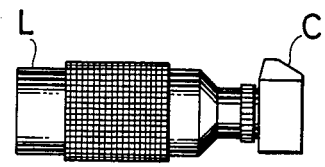
FIG. 11 is a side elevational view of a camera main body and, an interchangeable lens unit mounted thereon, with the camera main body held in a horizontal or lateral photographing position.
Figure 12:
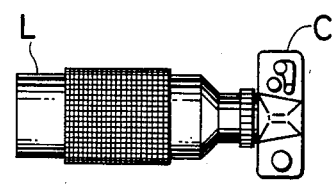
FIG. 12 is the same view as FIG. 11, showing the case where the camera main body is held in a vertical photographing position.

When a heavy and long interchangeable lens unit L is mounted on the camera main body C, it is inclined downwardly due to its load or weight against the pressure spring 14, as seen in in FIGS. 11 and 12. However, the above fact means that the angle of inclination of the interchangeable lens unit L in the case of horizontal position shooting as shown in FIG. 11, and that in the case of vertical position shooting as shown in FIG. 12 may be both represented by $\tan^{-1} \frac{\delta}{r+R}$. In the formula, in the similar manner as in the above description of the conventional example, $\delta$ represents the spacing amount between the seat faces 11c and 12c at the uppermost position in the uppermost peripheral part of the mount base 11 and mount portion 12, R denotes the distance from the lowermost position in the lower peripheral part of the mount base 11 and mount portion 12 where the seat faces 11c and 12c contact each other, up to the optical axis of the camera main body C, and r represents a distance from the uppermost position in the upper peripheral part of the mount base 11 and mount portion 12 where the bayonet claws 11a and 12a contact each other, up to the optical axis.

Thus, with the above bayonet mount arrangement, the angle of inclination of an interchangeable lens unit due to its load or weight is greatly reduced similarly both in the case of horizontal position shooting and vertical position shooting, and therefore, the tilting of the optical system of the interchangeable lens unit with respect to the film surface inside the camera main body may be reduced to a small value, with a consequent prevention of the undesirable "one sided out-of-focus". The function for reducing the inclination as described so far may be obtained not only in the case where the interchangeable lens unit is inclined with respect to the camera main body, but also when the camera main body tends to be inclined due to its load or weight with respect to the interchangeable lens unit as in the case, for example, where the interchangeable lens unit is secured on a tripod, with a motor drive unit and a long length film magazine, etc. being mounted on the camera body.

In the case where photographing is effected by mounting the camera on a tripod through utilization of a tripod screw on the camera main body, there are instances where impact imparted to the legs of the tripod during setting of the tripod on the ground is applied to the bayonet mount arrangement between the camera main body and an interchangeable lens, and the interchangeable lens unit is momentarily inclined with respect to the camera main body due to such kinetic load, which is generally very large. In the case of the conventional bayonet arrangement, such kinetic load may undesirably cause plastic deformation of the bayonet claws 1a and 2a located at the upper peripheral part of the mount base and the mount portion. However, in the case of the bayonet mount arrangement according to the present invention, the deformation of the bayonet claws 11a and 12a located at the upper peripheral part of the mount base 11 and mount portion 12 due to such kinetic load is alleviated by the dispersion and absorption of the load by the remaining bayonet claws 11a and 12a located at the lateral side peripheral parts of the mount base 11 and the mount portion 12.

Figure 1:
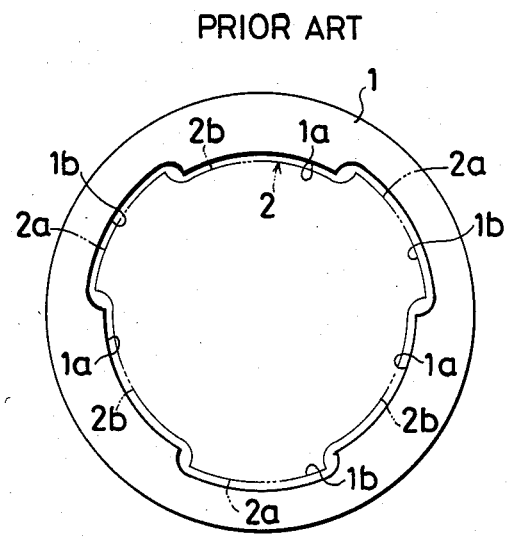
FIG. 1 is a schematic front elevational view of a conventional bayonet mount arrangement, showing the state before engagement occurs between the corresponding bayonet claws.
Figure 3:
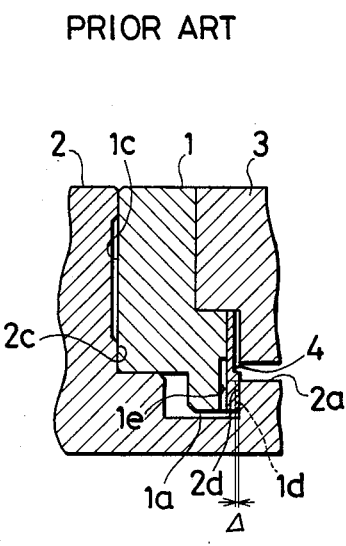
FIG. 3 is a cross section taken along the line III—III in FIG. 2.
Figure 2:
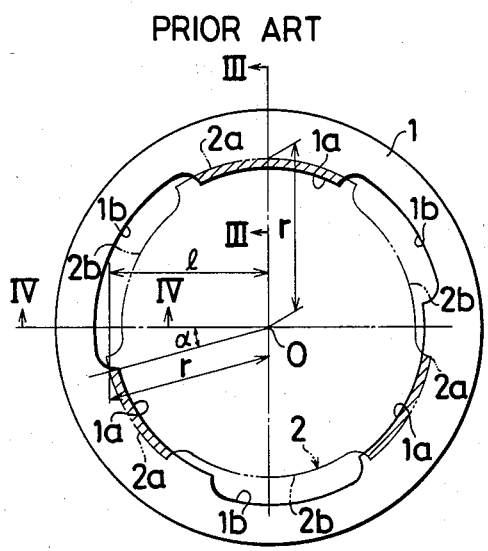
FIG. 2 is the same view as FIG. 1, showing the engagement completed state where the engagement between the corresponding bayonet claws has been completed.
Figure 4:
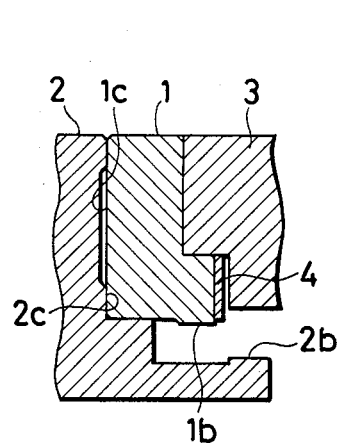
FIG. 4 is a cross section taken along the line IV—IV in FIG. 2.
Figure 5:
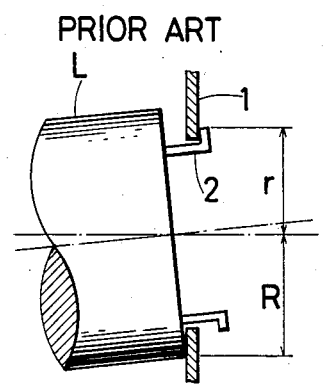
FIG. 5 is a schematic side elevational view explanatory of the inclination between a camera main body and a lens unit.
Figure 6:
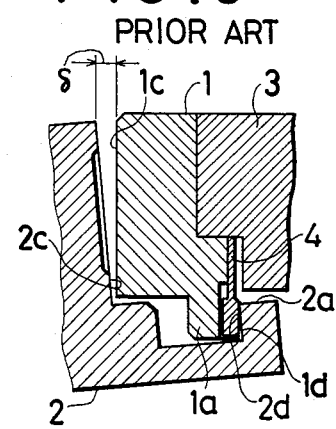
FIG. 6 is the same view as FIG. 3, showing the state of the inclination.

That is, in the state shown in FIG. 5, the clearance between the bayonet claws 11a and 12a located at the lateral side peripheral parts are smaller than those between the bayonet claws 1a and 2a located at the lateral lower side peripheral parts because the former are farther apart than the latter from the lowermost seat face contact position, so that bayonet claws 11a and 12a can engage one another earlier than bayonet claws 1a and 2a when the lens unit is further inclined with respect to the camera main body due to the load. Accordingly, any trouble with the bayonet mount arrangement due to the kinetic load as described above is advantageously prevented.

The ill effect of the inclination of the interchangeable lens unit as described previously is not only a problem in photographing performance such as the "one sided out-of-focus" referred to earlier, but may cause errors in the in-focus judgement or increase the time required for focusing in the case of an automatic focusing camera to be described subsequently, and therefore, a very strict accuracy with respect to any inclination is required. With the bayonet mount arrangement of the present invention, these ill effects are alleviated by the reduction in the inclination as stated above.

In the case where a T.T.L. phase difference focus detection (as disclosed in co-pending U.S. patent application Ser. No. 570,012 filed on Jan. 10, 1984 and assigned to the same assignee) system is employed in the camera main body as a focus detection mechanism in an automatic focusing camera, an interchangeable lens unit whose optical conditions are set to the allowable limit for the focus detection may give rise to an error in the focu detection if this lens unit is inclined with respect to the camera main body as described earlier, thereby erroneously judging an out-of-focus condition as an in-focus condition. However, according to the bayonet mount arrangement of the present invention, by the inclination reducing function as described earlier, such erroneous judgement can be reduced. Meanwhile, in the phase difference type focus detection system, an object image formed by the optical system of the interchangeable lens unit is reformed by a pair of reimaging lenses on first and second photocell arrays as first and second images, and coincidence between the first and second images is detected based on the outputs of the first and second photocell arrays to detect the distance therebetween. As the distance between the first and second images varies with the amount and direction of defocus, the amount and direction of defocus can be calculated from the detection of the distance between the first and second images and an in-focus position can be predicted based on the amount and direction of defocus. Therefore, in the system, coincidence between the first and second images must be detected without error and thus the luminous distributions of the first and second images must be consistent with one another. However, if the interchangeable lens is inclined with respect to the camera maind body, there occurs inconsistency between the luminous distributions of the first and second images so that error is involved in the detection of the coincidence between the first and second images, resulting in an error in the prediction of the in-focus position. Accordingly focus detection must be repeated with the optical system of the lens being shifted to the erroneously predicted in-focus position and therefore it takes some time to reach the real in-focus condition. Such a delay in the time up to the arrival at the real infocus condition is also alleviated by the inclination reducing function as described above.

Moreover, with the bayonet mount arrangement of the present invention, since the inclination as described above can be alleviated only by altering the disposition of the bayonet claws 11a and 12a from the conventional arrangements, there is no likelihood that the seat faces 11c and 12c are injured or that abraded particles are produced at the rear faces 11d and 12d of the bayonet claws 11a and 12a as in the case where the urging force of the pressure spring is set larger for reducing the inclination to the same extent. Also, the operability for attaching and detaching interchangeable lens units is not adversely effected. Furthermore, as compared with the conventional examples, it is only required to alter the dispostion of the bayonet claws 11a and 12a, and therefore, the bayonet mount arrangement of the present invention can be manufactured by the same process as for the conventional arrangements, without any increase in cost.

On the other hand, in the case of the bayonet mount arrangement of the present invention, it is seen from the comparison between the formulas $\tan^{-1} \delta/r + R$ and $\tan^{-1} \delta/r \cdot \cos\alpha + R$ that the small clearance $\Delta$ between the bayonet claws 11a and 12a may be set larger than that in the conventional arrangement to the extent that the resultant increase in the angle of inclination of the lens unit in the case of a a horizontal photographing with the camera main body held in a normal erect state does not cause serious problems. Thus, the dimensional accuracy at the respective mount portions 11 and 12 may be reduced by that extent, and therefore, strict control of a treated film thickness on the mount portions, for example, of plating or the like becomes unnecessary, with a consequent reduction of the manufacturing cost.

In the foregoing embodiment, although description has been given with respect ot the case where the interchangeable lens unit is directly coupled with the camera main body, it is needless to say that the similar bayonet mount arrangement can be applied between the lens unit and various accessory parts, and between the various accessory parts and the camera main body when the accessory parts are to be interposed between the camera main body and lens unit, for example, in the case of close-up photographing in which an extension ring is interposed between the interchangeable lens unit and the camera main body or in the case where a rear converter is interposed between lens unit and the main camera body.

Figure 13:
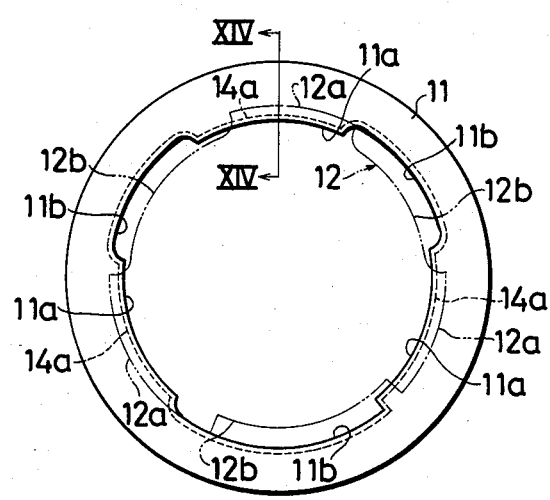
FIG. 13 is a front elevational view of a modified embodiment according to the present invention.
Figure 14:
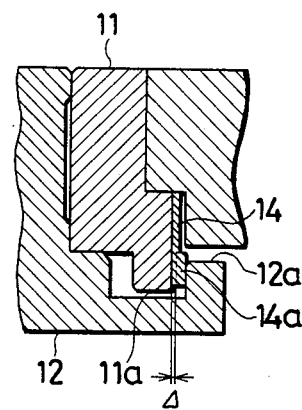
FIG. 14 is a cross section taken along the line XIV—XIV in FIG. 13.

Meanwhile, in the foregoing embodiment, concerning the inclination of the lens unit with respect to the camera main body, there has been described the case where the rear face 11d of the bayonet claw 11a of the camera main body and the rear face 12d of the bayonet claw 12a of the lens unit directly contact each other so as to restrict any further inclination. However, the arrangement is not limited to the above, but may be so modified, for example, as shown in FIGS. 13 and 14 that, with a part 14a of the pressure spring being interposed between the bayonet claws 11a and 12a, the rigid contact state between the camera main body and lens unit is maintained by the above interposed part 14a and the bayonet claw 12a of the lens unit for restriction of the inclination, thereby to provide a small clearance $\Delta$ for allowing the rotational management between the interposed member and the bayonet claw 12a of the lens unit.

Although the bayonet claws 11a and 12a are provided on mount base 11 and mount portion 12 respectively in the above embodiments, the bayonet claws 11a and mount base 11 and also the bayonet claws 12a and mount portion 12 may be separate members which are made integral upon assembling.

What is claimed is:

1. In an optical instrument adapted to connect two mating optical units by a bayonet mount arrangement which comprises annular mount members formed on each of the mating optical units and having mating mount surfaces, three sets of angularly separated bayonet claws, one bayonet claw of each set being provided integrally with the mount member of one member of one of the mating optical units and the other bayonet claw of each set being provided integrally with the mount member of the other optical unit, and biasing means provided on the one optical unit for urging the bayonet claws on the mount member of the other optical unit to ensure contact between the mating mount surfaces of the mount members when the connection between the mating optical units is completed, there being a small clearance between the corresponding bayonet claws of each of the sets with the mating mount surfaces being in contact with one another, the improvement of the bayonet arrangement wherein the bayonet claws of the three sets are relatively disposed and dimensioned, such that the corresponding bayonet claws of one of the sets engage one another at an upper peripheral part of the mount members just above the center of the mount members and the corresponding bayonet claws of the remaining two sets engage with one another at lateral side peripheral parts of the mount members diametrically opposite to one another with respect to the center of the mount members in the lateral direction, respectively, when said optical instrument is viewed from its front with said mating optical units connected with one another and held in a normally erect state.

2. The improvement as defined in claim 1, wherein the relative dispositions and dimensions of the bayonet claws of the three sets are such that no interference occurs between the corresponding bayonet claws of each of the sets only at a predetermined mutual angular position of the mating optical units.

3. The improvement as defined in claim 2, wherein the biasing means includes spring portions locted at the rear side of each of the bayonet claws integral with the mount member of the one mating optical unit at a radial position approximately the same as the radial position of the bayonet claw.

4. The improvement as defined in claim 3, wherein the bayonet claws of the sets integral with the mount member of the one mating optical unit respectively have on their rear faces notched portions adapted to receive the spring portions therein so that direct contact can occur between the correspoindng bayonet claws of each of the sets.

5. The improvement as defined in claim 3, wherein the corresponding bayonet claws of the sets are adapted to engage one another with the spring portions interposed therebetween.

6. An interchangeable optical unit detachably attachable on a main optical unit through a bayonet mount arrangement, said interchangeable optical unit comprising:

an annular mount member; and bayonet claws consisting of three radially outwardly projecting bayonet claws provided integrally with the mount member and angularly separated from one another, one of the bayonet claws having a portion located at an upper peripheral part of the mount member immediately above the center of the mount member and the remaining two bayonet claws having portions located at lateral side peripheral parts of the mount member diametrically opposite to one another with respect to the center of the mount member in the lateral direction, respectively, when the interchangeable optical unit attached to the main optical unit is viewed from its front with the main optical unit held in a normally erect state, whereby the mount member and the three bayonet claws constitute parts of the bayonet mount arrangement on the side of the interchangeable optical unit.

7. A main optical unit on which an interchangeable optical unit is detachably attachable through a bayonet mount arrangement, said main optical unit comprising:

an annular mount member;

three radially inwardly projecting bayonet claws provided integrally with the mount member and angularly separated from one another, one of the bayonet claws having a portion located at an upper peripheral part of the mount member immediately above the center of the mount member and the remaining two bayonet claws having portions located at lateral side peripheral portions of the mount member diametrically opposite to one another with respect to the center of the mount member in the lateral direction, respectively, when the main optical unit is viewed from its front with the main optical unit held in a normal erect state; and a biasing means having spring portions located at the rear side of each of the bayonet claws, whereby the mount member, the three bayonet claws and the biasing means constitute parts of the bayonet mount arrangement on the side of the main optical unit.

8. In an optical device normally employed in a predetermined attitude and including a pair of first and second component units, a bayonet coupling separably joining said units and comprising separable first and second coaxial complementary annular coupling sections located in respective units and having respective mutually slidably confronting positioning faces superimposed in the bayonet coupling fully coupled condition, three peripherally spaced radially inwardly projecting first claws extending peripherally along said first section and three peripherally spaced radially outwardly projecting second claws extending along said second section, corresponding first and second claws overlapping and having slightly longitudinally spaced confronting coupling faces and biasing means urging said sections toward superimposition of said positioning faces; the improvement wherein in said predetermined attitude of said optical device and the fully coupled condition of said coupling sections said confronting faces of a first pair of corresponding first and second claws overlap in an area directly vertically above the center of said coupling sections and said confronting faces of the second and third pairs of corresponding first and second claws overlap in areas at diametrically horizontally laterally opposite sides relative to said center of said coupling sections.

9. The improvement of claim 8 wherein said optical device comprsies a camera, some of said component units being the camera body and the other of said component units being an interchangeable objective lens.

10. The improvement of claim 8 wherein said biasing means includes springs dispersed between and engaging said confronting faces of respective pairs of said claws.

* * * * *